US012274663B2

(12) United States Patent
Li

(10) Patent No.: US 12,274,663 B2
(45) Date of Patent: Apr. 15, 2025

(54) WALKER WITH SUPPORT FOR BUTTOCKS AND ELBOW

(71) Applicant: Innomotive L.L.C, Bloomfield, MI (US)

(72) Inventor: Tianfu Li, Bloomfield, MI (US)

(73) Assignee: Innomotive L.L.C, Bloomfield, MI (US)

( * ) Notice: Subject to any disclaimer, the term of this patent is extended or adjusted under 35 U.S.C. 154(b) by 336 days.

(21) Appl. No.: 18/076,646

(22) Filed: Dec. 7, 2022

(65) Prior Publication Data

US 2023/0225926 A1 Jul. 20, 2023

(30) Foreign Application Priority Data

Dec. 9, 2021 (CN) ........................ 202123085710.3

(51) Int. Cl.
*A61H 3/04* (2006.01)

(52) U.S. Cl.
CPC ....... *A61H 3/04* (2013.01); *A61H 2201/0161* (2013.01); *A61H 2201/0192* (2013.01); *A61H 2201/1633* (2013.01); *A61H 2201/1635* (2013.01)

(58) Field of Classification Search
CPC .............. A61H 3/04; A61H 2201/0161; A61H 2201/16331; A61H 2201/1633
See application file for complete search history.

(56) References Cited

U.S. PATENT DOCUMENTS 2,843,180 A * 7/1958 Schwartz ................. A61H 3/04 482/68
4,226,413 A * 10/1980 Daugherty ............ B60B 33/021 482/67
5,020,560 A * 6/1991 Turbeville ............... A61H 3/04 280/282
6,003,532 A * 12/1999 Pi ............................. A61H 3/04 135/84
6,070,603 A * 6/2000 Politz ........................ A61H 3/04 135/65
6,296,263 B1 * 10/2001 Schultz .................... A61H 3/04 280/304.5

(Continued)

FOREIGN PATENT DOCUMENTS

WO WO-03086264 A1 * 10/2003 ............... A61H 3/04

*Primary Examiner* — Erez Gurari
(74) *Attorney, Agent, or Firm* — Jacob M. Ward; Ward Law Office LLC

(57) ABSTRACT

This is a mobility aid for disabled persons, including a front frame, a rear frame, and a handle frame. The front frame comprises two front legs having front wheels at the bottom ends thereof. The rear frame is attached to the front frame and includes a saddle seat and a rear leg having a rear wheel attached thereto. The handle frame includes a handle horizontal tube and a vertical handle member depending therefrom. The vertical handle member is attached to the front frame. The handle horizontal tube includes an elbow support at each end and a hand rest support plate having a pair of hand rest spheres. A patient can sit on the saddle seat with their elbow resting on the elbow support so that some or most of their body weight is supported by the saddle and elbow support, while the feet can walk freely.

20 Claims, 8 Drawing Sheets

(56) References Cited

U.S. PATENT DOCUMENTS

| | | | | |
|---|---|---|---|---|
| 2009/0045021 | A1* | 2/2009 | Einbinder | B60T 17/22 74/502.2 |
| 2009/0058036 | A1* | 3/2009 | Hoepner | A61H 3/04 280/267 |
| 2009/0058037 | A1* | 3/2009 | Accetta | A61H 3/04 280/267 |
| 2011/0023920 | A1* | 2/2011 | Bolton | A61H 3/04 135/66 |
| 2011/0109058 | A1* | 5/2011 | Janis | A61H 3/04 280/263 |
| 2012/0187661 | A1* | 7/2012 | Kim | A61H 3/04 280/47.38 |
| 2012/0280467 | A1* | 11/2012 | Walther | B62K 5/05 280/263 |
| 2017/0112706 | A1* | 4/2017 | Bruk | A61H 3/04 |
| 2017/0165146 | A1* | 6/2017 | Franson | B62K 5/05 |
| 2017/0209319 | A1* | 7/2017 | Fawcett | A61G 5/125 |
| 2019/0224065 | A1* | 7/2019 | Hashimoto | A61H 3/0288 |
| 2020/0390638 | A1* | 12/2020 | Jernigan, IV | B62K 25/02 |
| 2021/0154065 | A1* | 5/2021 | Brown | A61H 3/04 |
| 2021/0236377 | A1* | 8/2021 | Zibley | A61H 3/04 |

* cited by examiner

WALKER WITH SUPPORT FOR BUTTOCKS AND ELBOW

CROSS-REFERENCE TO RELATED APPLICATIONS

This application claims priority to Chinese Patent Application No. 202123085710.3, filed on Dec. 9, 2021, the entire disclosure of which is hereby incorporated herein by reference.

FIELD

The present invention relates to an assistive device, in particular a mobility aid for persons with disabilities.

BACKGROUND

Many diseases affect a person's walking ability and hinders their ability to use their legs. Such diseases include arthritis, ankylosing spondylitis, gout, rheumatoid arthritis, leg fractures, amputation, muscle or tendon strain, stroke, extreme weakness after sickness or surgery. These patients need early ambulation to prevent pneumonia, blood clot, muscle atrophy and deconditioning, and to also provide foundation for the early recovery of the most basic motor and physiological functions. Mobility devices, such as device commonly referred to as walkers, are often employed to help patients achieve ambulation. There is a continuing need for improvements in mobility devices to help patients achieve ambulation at the earliest possible in their adaption and recovery process.

SUMMARY

The object of the present invention is to provide an assistive device, which may be referred to as a mobility aid, a walking aid or a walker, for patients, such as disabled people and people recovering from illnesses and injuries, which will maximize the function of supporting the body weight of the patient without affecting their normal gait pattern and, thus, facilitate early ambulation of the patient.

To achieve the above objectives, the present invention adopts the following technical solutions:

The present invention is a mobility aid for use in physiotherapy, which has the characteristics of a reversed tricycle structure. It supports the patient through the buttocks, elbows, and hands to completely support the patient's weight and balance. Meanwhile, the patient's feet can still be used to propel themselves while walking. The hand grips and elbow supports will allow the frame to be controlled and directed while moving. Because there are one or more caster wheels, this mobility aid does not only constantly provide support and stabilization during both standing and walking, but also provides for the possibility and convenience of turning. It provides the patient with multi-point support at the same time, which gives the patient great freedom to ride and propel on one or both feet.

To accomplish this goal, the present invention provides a mobility aid for disabled persons, including a front and rear frame. The front frame consists of an inverted "U" shape for the front legs, with a connection tube in between the bottom of the legs. The bottom end of the two front legs is equipped with front wheels, while the top is connected with a vertical tube. The vertical tube is inserted with a vertical tube of the handle bar, the handlebar is in the structure of a "T" shape, and has a horizontal tube on top of a vertical tube. The top end of the vertical tube is connected to the middle of the horizontal tube of the handle bar, which is C-shaped and opens backwards.

The rear frame consists of an inverted "L" shaped rear leg. The bottom of the rear leg has a rear wheel, and the top of the leg has a seat attached to it. The top of the back frame connects with the front frame through two horizontal tubes on the front frame.

In one embodiment, the top of rear leg has a horizontal pivot axle, which connects the two connecting tubes. The top end of the rear leg has positioning holes in front of the pivot axle, which holds positioning pins inserted into the corresponding holes on two tubes in the front frame. There is a plate fixed at the bottom end of two tubes to limit the chances of the rear leg over-rotating.

In one embodiment, a wire connects the bottom of the rear leg and the middle of the connection tube on the front frame.

In one embodiment, at the bottom of the rear leg pivotally joined with the first inverted "U" shaped folding tube, at about the middle of the connecting tube of the front frame, an external ring is provided. One side of the external ring is connected with the second folding tube and the end of the second folding tube is pivotably joined with first folding tube. Furthermore, the top of the second folding tube is provided with a ring-shaped support, which corresponds to the triangle made of the two connection tubes of the front frame and the two legs of the front frame.

In one embodiment, a vertical saddle rod extends downward from the bottom of the saddle seat. The saddle rod comprises a first and second segment connected sequentially from top to bottom, and the cross section of the first segment is square, the cross section of the second segment is circular. While the top of the rear leg tube has several square holes which correspond to the saddle seat rod. The shape and size of the square hole match to the cross-section of the first segment rod, and the bottom end of the saddle rod is provided with a rubber ring.

In one embodiment, each end of the horizontal handle tube has a rotating handle tube, where one side of the handle tube supports an elbow support, the elbow support cross section looks like the letter "C" and opens upward. There are several corresponding positioning holes on the rotating handle tube and horizontal handle tube. Inside of the position hole has a positioning pin. At the middle of the horizontal handle tube there is a hand supporting board. There are two hand supporting gripping tubes on the hand supporting board, with two balls on the top of hang gripping tubes that the patient can hold onto.

In one embodiment, the front wheel is a regular wheel, while the rear wheel is a cast wheel or a friction disk.

In one embodiment, the front wheel is a caster wheel, the rear wheel is a regular straight wheel or friction disk.

In one embodiment, the bottom of the front leg tube is inserted with a front leg extension tube. The front leg tube and the front leg extension tube have a number of corresponding positioning holes and a push pin to go through the position hole which prevents two tubes from sliding and rotating. The bottom of the rear leg tube is inserted with a rear leg extension tube, and those are provided with a number of corresponding positioning holes. A push pin can go through the position hole and can adjust the extension tube length and prevent it from sliding and rotating.

In one embodiment, the front leg connection tube is provided with a stretchable band, where the end of the band has a Velcro band for quick attachment.

The advantages of the present invention are as follows: the mobility aid for patients, such as disabled people and people recovering from illnesses and injuries, can maximize supporting the patient's body weight without affecting the normal use of their legs in ambulation. The seat can be easily adjusted, which not only allows the patient to easily get on and off of the walker, but also allows the legs on both sides to move back and forth. These advantages can all be achieved while the patient is upright.

In yet another embodiment, a walker is disclosed having a front frame, a rear frame, and a handle frame. The front frame having an inverted "U" shape forming front legs and including a front wheel disposed at an end of each of the front legs. A front leg connector may be disposed between and joined to the front legs. A pair of frame connectors may be joined to a top generally horizontal portion of the front frame and configured to connect to the rear frame. A vertical tube may be disposed in the top generally horizontal portion of the front frame between the pair of frame connectors and configured to slidably receive the handle frame. The rear frame may have an inverted "L" shape, wherein a lower portion of the rear frame forms a rear leg and an end of an upper portion of the rear frame is joined to the frame connectors of the front frame. A rear wheel may be disposed at an end of the rear leg and a saddle seat may be disposed on the upper portion of the rear frame. The handle frame may have a "T" shape formed by a horizontal handle member and a vertical handle member depending from the horizontal handle member, wherein the vertical handle member is configured to be slidably received by the vertical tube of the front frame.

In some embodiments, the walker may include a first folding rod and a second folding rod. The first folding rod having a first end and a second end, the first end pivotally attached to the rear leg of the rear frame. The second folding rod having a first end and a second end, the first end pivotally attached to the front leg connector of the front frame and the second end pivotally attached to the second end of the first folding rod.

In some embodiments, the walker according to may include a ring-shaped support disposed on the second folding rod and configured to selectively hold an article.

Embodiments may also include one of the frame connectors of the front frame having a rear frame positioning hole, and the rear frame having a rear frame locking pin, the rear frame locking pin and the rear leg positioning hole configured to cooperate to lock a position of the rear frame with respect to the front frame.

In some embodiments, the walker may include a wire rope having a first end and a second end, the first end coupled to the front leg connector of the front frame and the second end coupled to the rear leg of the rear frame.

In some embodiments, the rear frame may be pivotally connected to the pair of frame connectors of the front frame.

In some embodiments, the front frame may include a blocking plate disposed between and joined to the pair of frame connectors of the front frame, the blocking plate configured to limit a range of pivoting motion between the front frame and the rear frame.

In some embodiments, the front wheel and the rear wheel may be selected from the group consisting of a caster wheel, a disk wheel, and a friction block.

Embodiments may also include each front leg having an adjustable front leg member in slidable relation to the front frame, and the rear leg having an adjustable rear leg member in slidable relation to the rear frame, the adjustable front leg member and the adjustable rear leg member configured to adjust a height of the walker.

Embodiments may also include each front leg and the rear leg having a position hole, and each adjustable front leg member and the adjustable rear leg member having a locking pin, wherein the position hole and the locking pin are configured to cooperate to maintain the walker at an adjusted height.

In some embodiments, the rear frame includes a saddle seat hole and the saddle seat includes a saddle seat rod depending from the saddle seat, the saddle seat hole and the saddle seat rod configured for the saddle seat rod to be slidably received by the saddle seat hole to secure the saddle seat to the rear frame.

In some embodiments, the saddle seat rod includes a first segment and a second segment, the first segment connected to the saddle seat and having a generally rectangular cross-sectional shape, the second segment having a generally circular cross-sectional shape and a ring member attached to the second segment, the ring member configured to be placed on the second segment of the saddle seat rod when the saddle seat rod is received in the saddle seat hole to facilitate retaining the saddle seat rod in the saddle seat hole.

In some embodiments, the saddle seat hole has a rectangular shape and may be configured to receive the first segment of the saddle seat rod, the rectangular shape of the saddle seat hole and the rectangular shape of the first segment of the saddle seat rod cooperate to militate against a rotation of the saddle seat with respect to the rear frame when the first segment of the saddle seat rod is received by the saddle seat hole.

In some embodiments, the vertical handle member of the handle frame includes a first handle positioning hole, the vertical tube of the front frame includes a second handle positioning hole, and a handle positioning pin is provided. The handle positioning pin may be configured to be selectively received through the first handle positioning hole and the second handle positioning hole to position the horizontal handle member of the handle frame at a desired height with respect to the front frame.

In some embodiments, the handle frame includes a hand support plate attached to a center portion of the horizontal handle member. The hand support plate may include a hand gripping sphere attached to a top surface of the hand support plate.

In some embodiments, the handle frame includes an elbow support attached adjacent an end portion of the horizontal handle member.

In some embodiments, the elbow support includes a rotatable handle sleeve configured to receive the horizontal handle member. The rotatable handle sleeve may include an elbow support positioning hole and the horizontal handle member may include an elbow support positioning pin. The elbow support positioning hole and the elbow support positioning pin cooperate to secure the elbow support at a desired position with respect to the horizontal handle member.

In some embodiments, the walker may include a stretch band connected to the front leg connector.

Embodiments of the present disclosure may also include a walker having a front frame, a rear frame, and a handle frame. The front frame may have an inverted "U" shape forming front legs. A front wheel may be disposed at an end of each of the front legs. Embodiments may also include a front leg connector disposed between and joined to the front legs. A pair of frame connectors may be provided that are joined to a top generally horizontal portion of the front frame and configured to connect to the rear frame. A blocking plate may be disposed between and joined to the pair of frame connectors. A vertical tube may be disposed in the top generally horizontal portion of the front frame between the pair of frame connectors and configured to slidably receive the handle frame. In some embodiments, the rear frame may have an inverted "L" shape, wherein a lower portion of the rear frame forms a rear leg and an end of an upper portion of the rear frame is pivotally joined to the frame connectors of the front frame. A wheel may be disposed at an end of the rear leg and a saddle seat may be disposed on the upper portion of the rear frame. In some embodiments, the handle frame may have a "T" shape formed by a horizontal handle member and a vertical handle member depending from the horizontal handle member. The vertical handle member may be configured to be slidably received by the vertical tube of the front frame. Embodiments may also include a hand support plate attached to a center portion of the horizontal handle member, wherein the hand support plate may include a hand gripping sphere attached to a top surface of the hand support plate. Embodiments may also include an elbow support rotatably attached adjacent an end portion of the horizontal handle member.

The present disclosure also includes a method of using a walker, including providing a walker having a front frame, a rear frame, and a handle frame. In some embodiments, the front frame may have an inverted "U" shape forming front legs and include a front wheel disposed at an end of each of the front legs. Embodiments may also include a front leg connector disposed between and joined to the front legs. A pair of frame connectors may be provided that are joined to a top generally horizontal portion of the front frame and configured to connect to the rear frame. A vertical tube may be disposed in the top generally horizontal portion of the front frame between the pair of frame connectors and configured to slidably receive the handle frame. In some embodiments, the rear frame may have an inverted "L" shape, wherein a lower portion of the rear frame forming a rear leg and an end of an upper portion of the rear frame is joined to the frame connectors of the front frame. A rear wheel may be disposed at an end of the rear leg and a saddle seat may be disposed on the upper portion of the rear frame. The handle frame may have a "T" shape formed by a horizontal handle member and a vertical handle member depending from the horizontal handle member, the vertical handle member configured to be slidably received by the vertical tube of the front frame.

Embodiments may also include methods of using the walker by a user. Such methods may include a user performing one of standing over the rear frame with the rear frame located between the legs of the user, walking while being supported by the walker, and supporting a buttock with the saddle seat of the rear frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
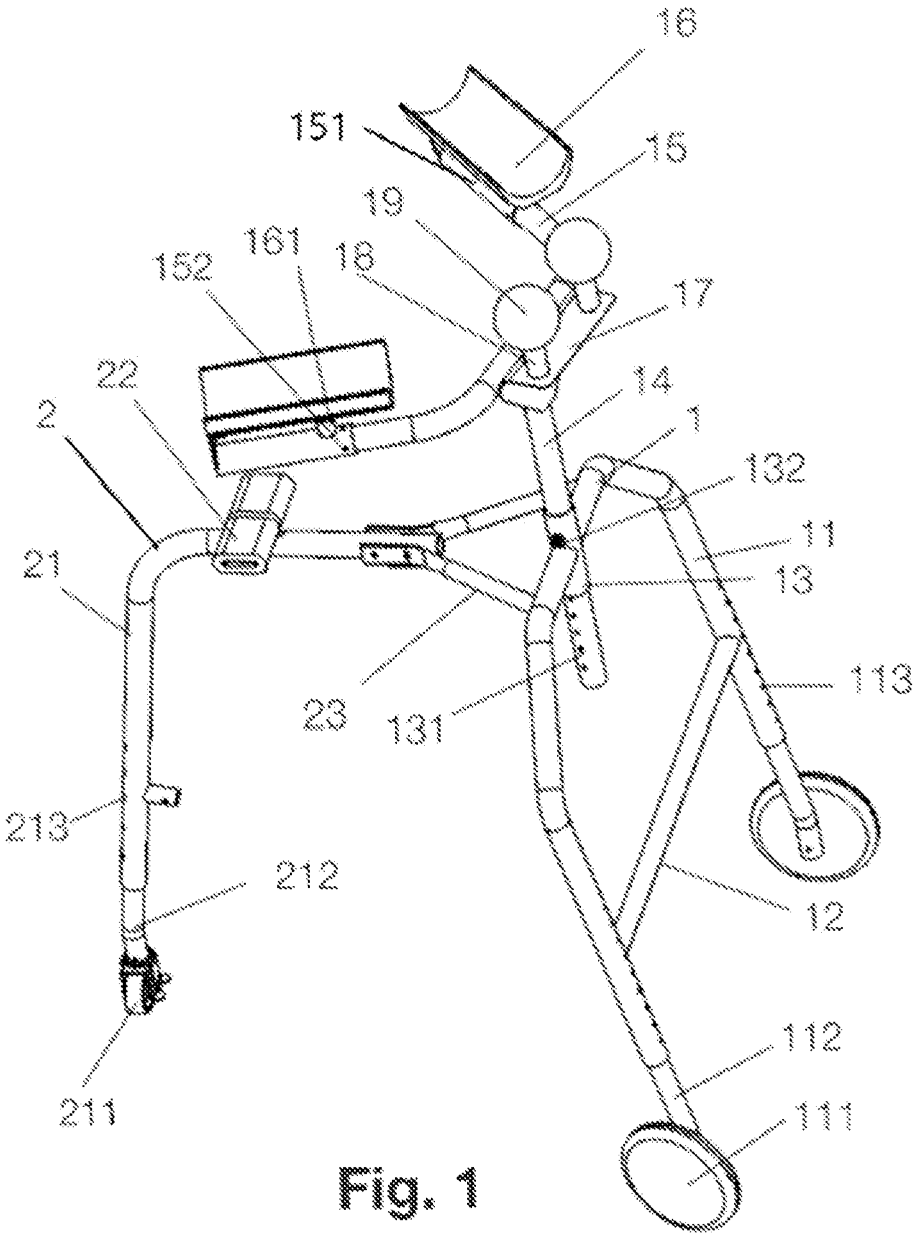
FIG. 1 is a side top perspective view of the walker according to one embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIG. 1, the present invention provides a mobility aid, commonly referred to as a walker, for patients, such as disabled people and people recovering from illnesses and injuries, to facilitate ambulation for the patient at the earliest possible point in their adaption and/or recovery process. The mobility aid includes a front frame 1, a rear frame 2 and a handle frame. In the illustrated embodiment, the front frame 1, the rear frame 2, and the handle frame 3 are formed from essentially hollow tubing having selected inner and outer diameters to facilitate slidably receiving selected components of the front frame 1, the rear frame 2, and the handle frame 3. A wall thickness of the hollow tubing may be selected by one skilled in the art to provide a desired strength and weight of the mobility aid. Furthermore, the material of the tubing can be a metal material, such as steel or aluminum, for example, or a non-metal material, such as a plastic, fiberglass or bamboo, for example. It should be understood that other materials may be selected by one skilled in the art to provide the desired strength and weight for the mobility device 10. It should be understood that the front frame 1, the rear frame 2, and the handle frame may be formed from structural elements other than tubing, such as solid rod, for example.

The front frame 1 comprises an inverted U-shaped front leg tube 11. The bottom of the two front legs are connected by a front leg connection tube 12. Both front leg tubes 11 are equipped with front wheels 111 at the bottom end and the top end of both front leg tubes 11 are connected to the vertical tube 13 on each side. The vertical tube 13 is inserted with another vertical tube 14 on the handle frame, and the top of vertical tube 14 is connected with the middle of the horizontal tube 15 of the handle frame. The horizontal handle tube 15 is "C"-shaped, and each end of horizontal handle tube 15 is provided with an elbow support 16. The elbow support 16 cross-section is C-shaped and opens upward, which allows the support to be completed while patient is in an upright position. The front of the middle horizontal handle tube 15 has a hand support plate 17, which is provided with two vertical grip tubes 18 that extend upward from the upper surface. Both vertical hand gripping 18 are provided with a hand gripping sphere 19 on the top.

The rear frame 2 includes an inverted L-shaped rear leg tube 21, and the bottom end is provided with a rear wheel 211. The top of the rear frame 2 is equipped with a saddle seat 22. The front top end of the rear leg tube 21 is connected to the front leg tube 11 by two connecting tubes 23 on both sides.

Figure 2:
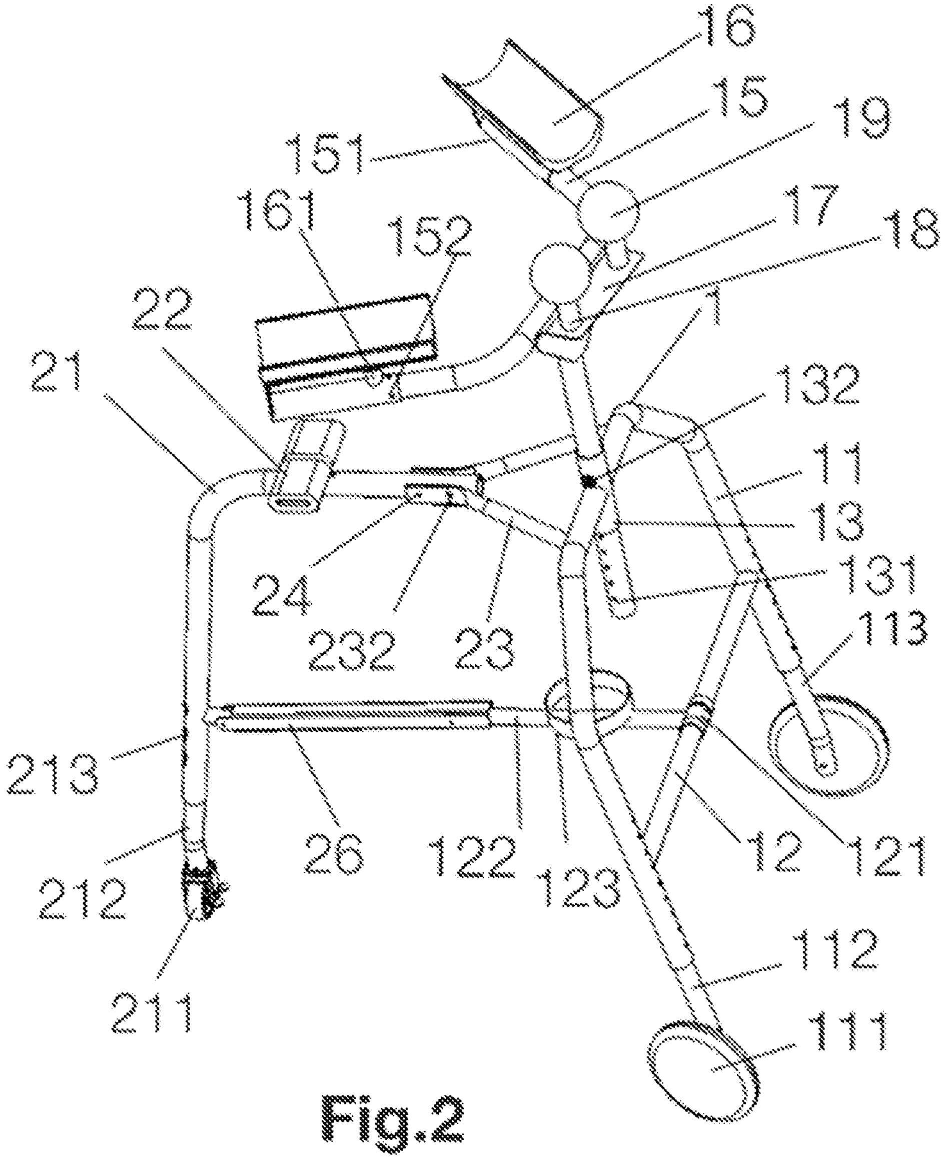
FIG. 2 is a side top perspective view of the walker according to another embodiment of the present disclosure.
Figure 3:
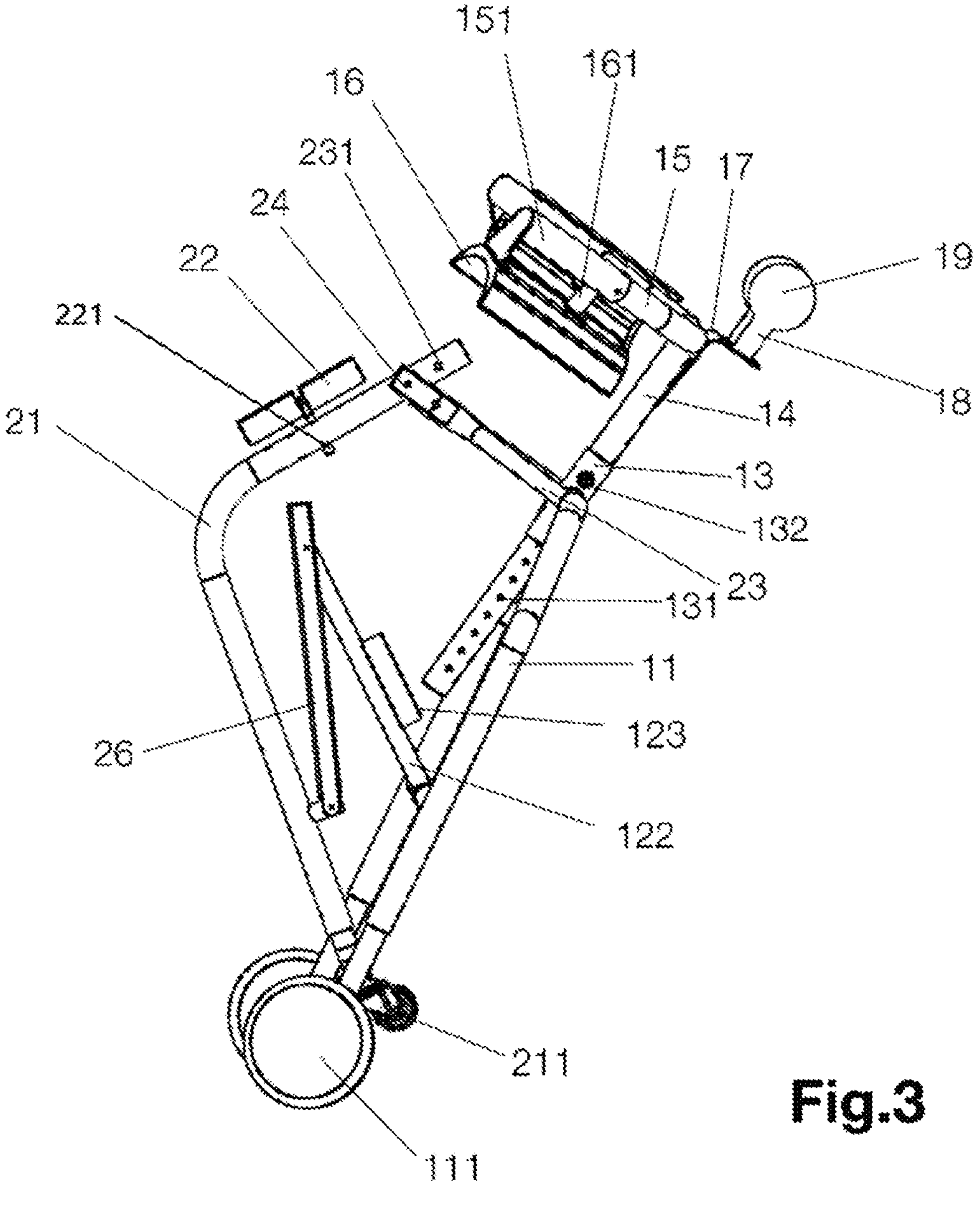
FIG. 3 is a side elevational view of the walker of FIG. 2 in a folded configuration.
Figure 4:
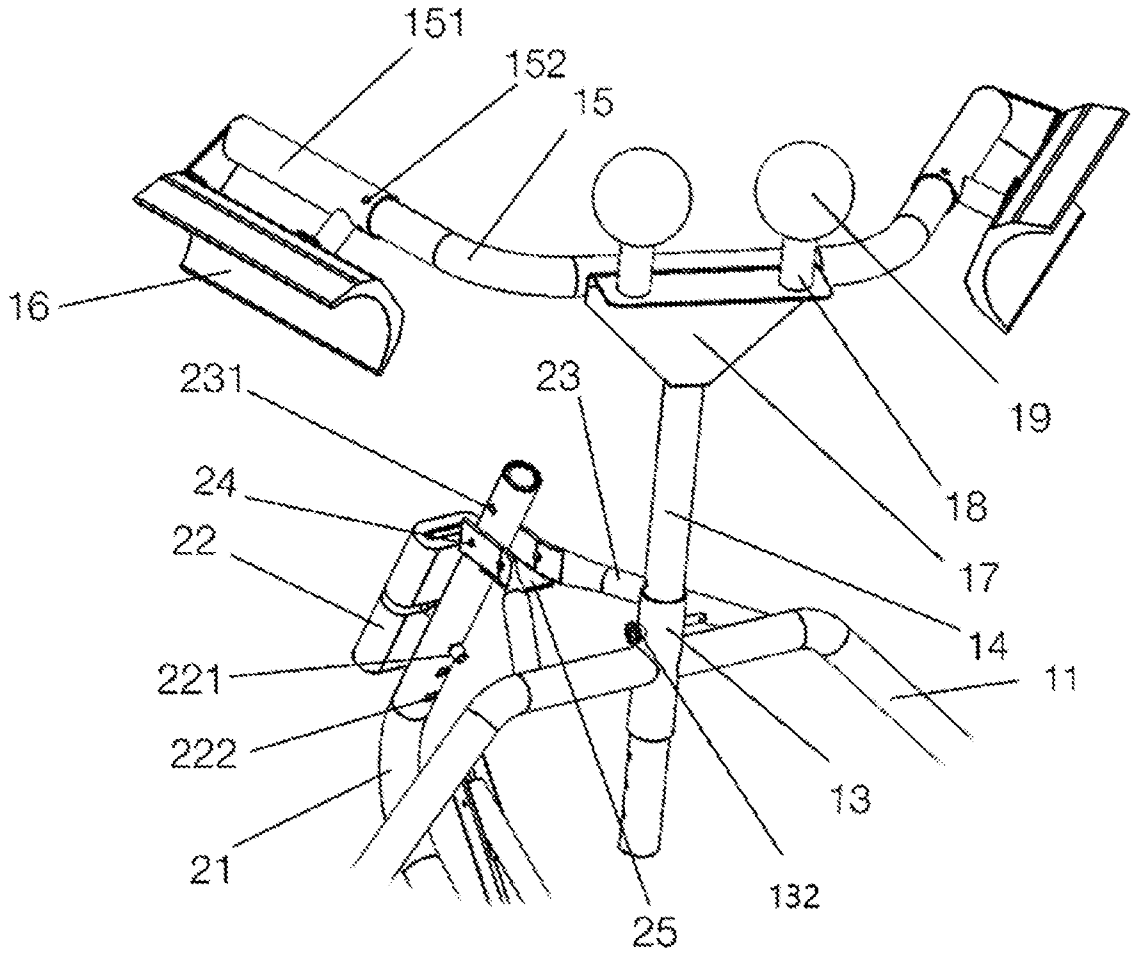
FIG. 4 is an enlarged fragmentary top perspective view of the walker of FIG. 3.

The above is an embodiment of the present invention 1, as shown in FIGS. 2-4. The difference with Example 1 is that the mobility aid in the present embodiment may be folded. The specific structure is as follows: The rear leg tube 21 is provided with a horizontal axis 24, while the two connecting tubes 23 join with the rear leg 21 through the axis 24. This makes it so that the rear leg 21 may rotate around the axis 24 or the front frame 1 may rotate around the axis 24. The rear frame 2 and the front frame 1 can be folded together, and after unfolding, the top of the rear leg tube 21 and connecting tube 23 are provided with a corresponding rear leg positioning hole 213. The rear leg positioning hole 231 is inserted with a positioning push pin 232 through the positioning push pin 232 which prevents rotation between front frame 1 and rear frame 2.

Furthermore, the bottom of the rear leg tube 21 is joined with a cross-section as an inverted U-shape that first folding rod 26. The middle of front leg connection tube 12 is provided with a rotatable sleeve tube 121, and on the side of the sleeve tube 121 there is a second folding rod 122, The end of the second folding rod 122 is articulated with the first folding rod 26, this structure also limits the excessive unfolding in between front frame 1 and rear frame 2. Further, on the top surface of the second folding rod 122 is fixed the ring-shaped support 123, the support 123 corresponds to the triangular hole formed in between two connecting tubes 23 and two front leg tubes 11, for placing oxygen cylinders or other cylindrical items.

Figure 5:
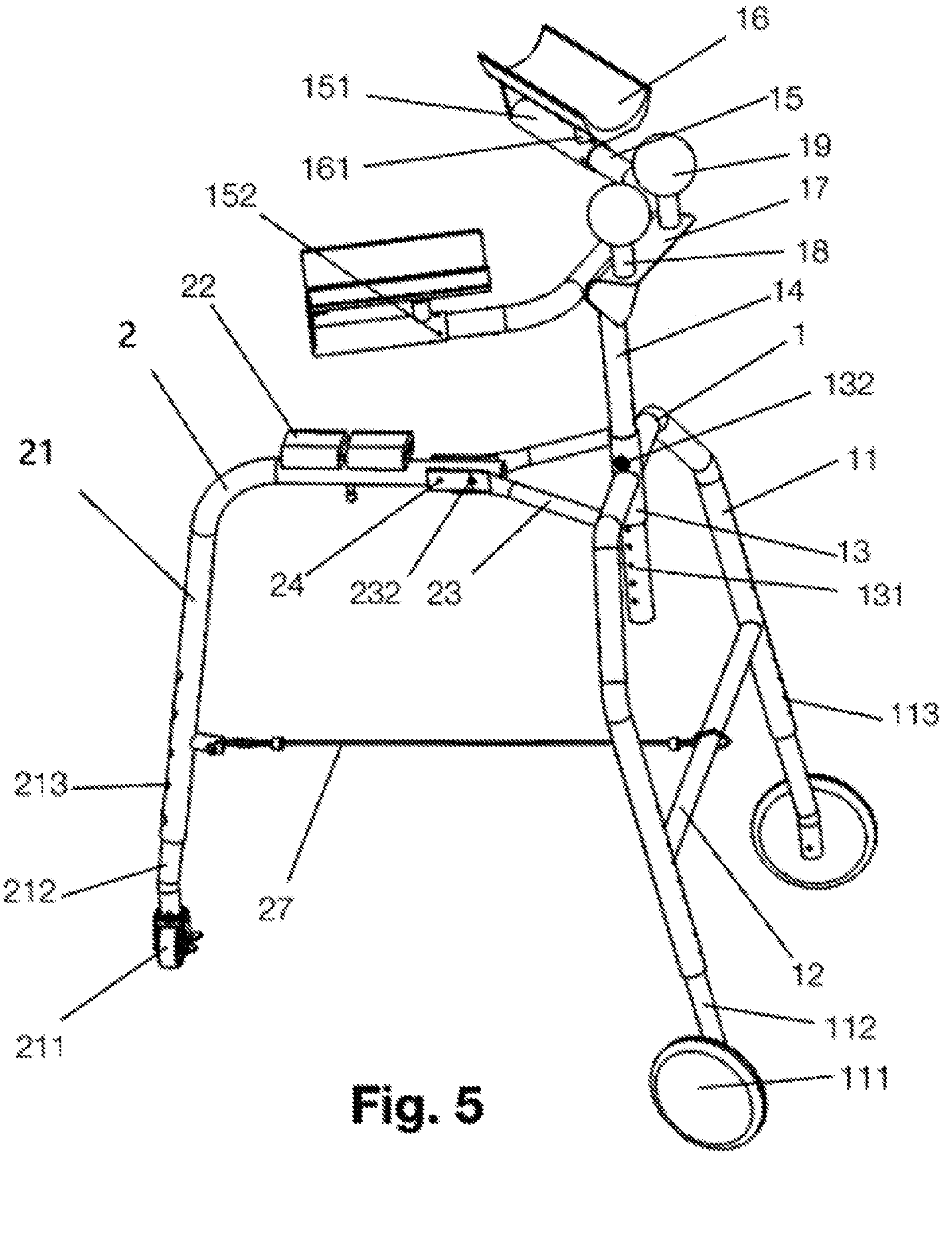
FIG. 5 is a side top perspective view of the walker according to another embodiment of the present disclosure.
Figure 6:
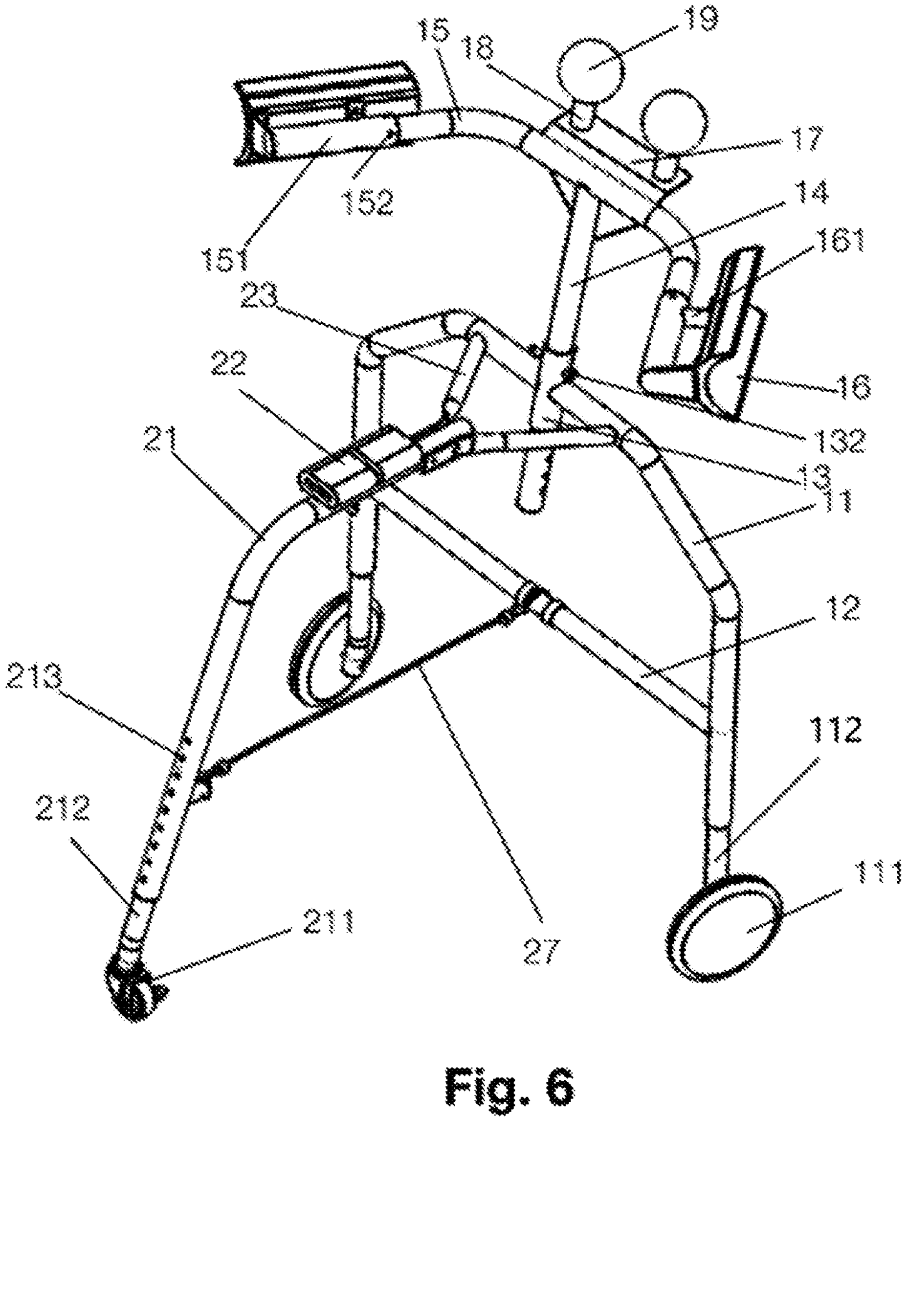
FIG. 6 is rear top perspective view of the walker shown in FIG. 5.

Further, as shown in FIGS. 5-6, it is the third embodiment of the present invention, the difference with Example 2 is that, in order to limit the rotation between the front frame 1 and the rear frame 2, to prevent excessive unfolding, a wire rope 27 connect the bottom of the rear legs tube 21 and the middle of the front leg connection tube 12, it replace the first folding rod 26 and the second folding rod 122, limiting the extension angle of the rear frame 2 with front frame 1.

Figure 7:
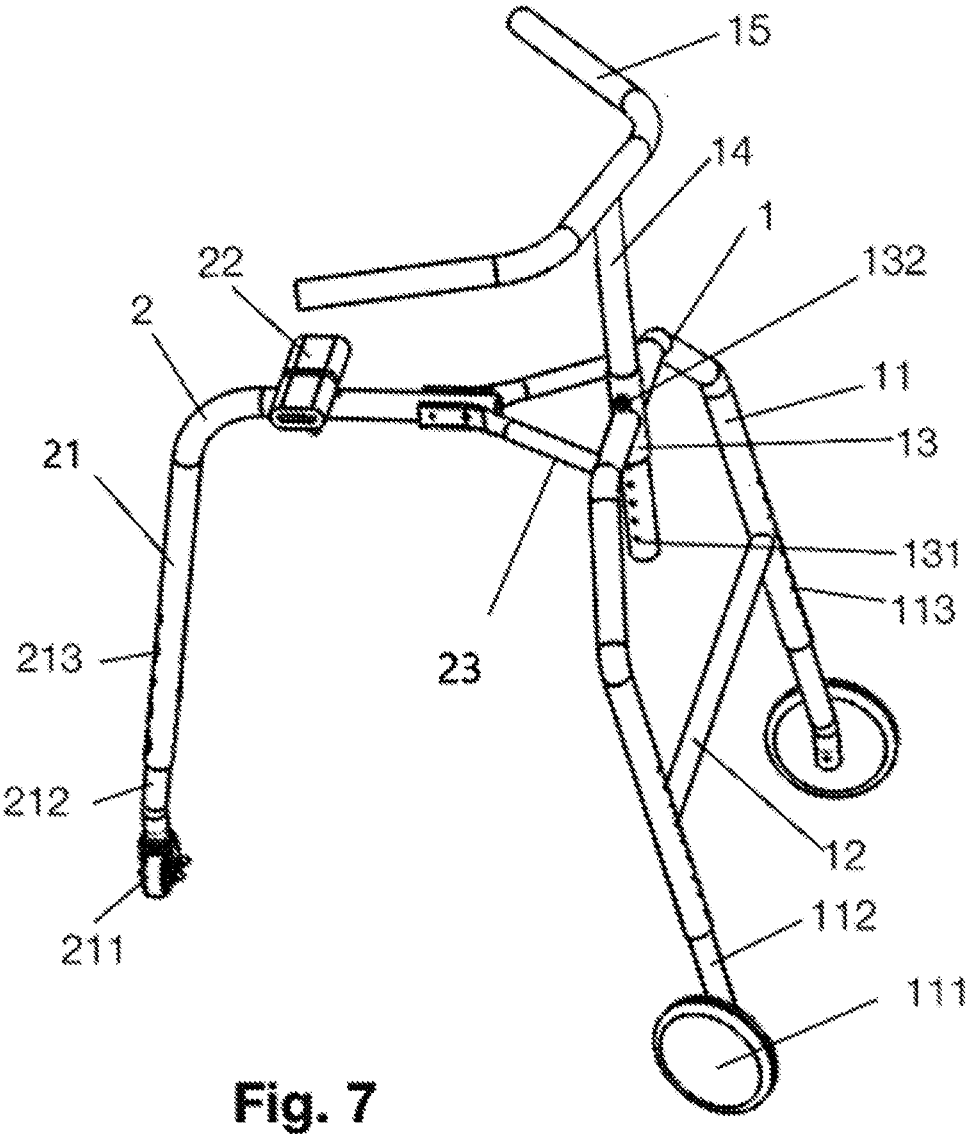
FIG. 7 is a side top perspective view of the walker according to another embodiment of the present disclosure.

Further, as shown in FIG. 7, which is the fourth embodiment of the present invention, the difference from Example 1 is that there are elbow supports 16 at the end of horizontal handle tube 15. The elbow support 16 has an opening looking upwards, and at the front middle of the horizontal handle tube 15 there is a hand grip support plate 17, a hand grip vertical tube 18, and hand grip sphere 19.

Figure 8:
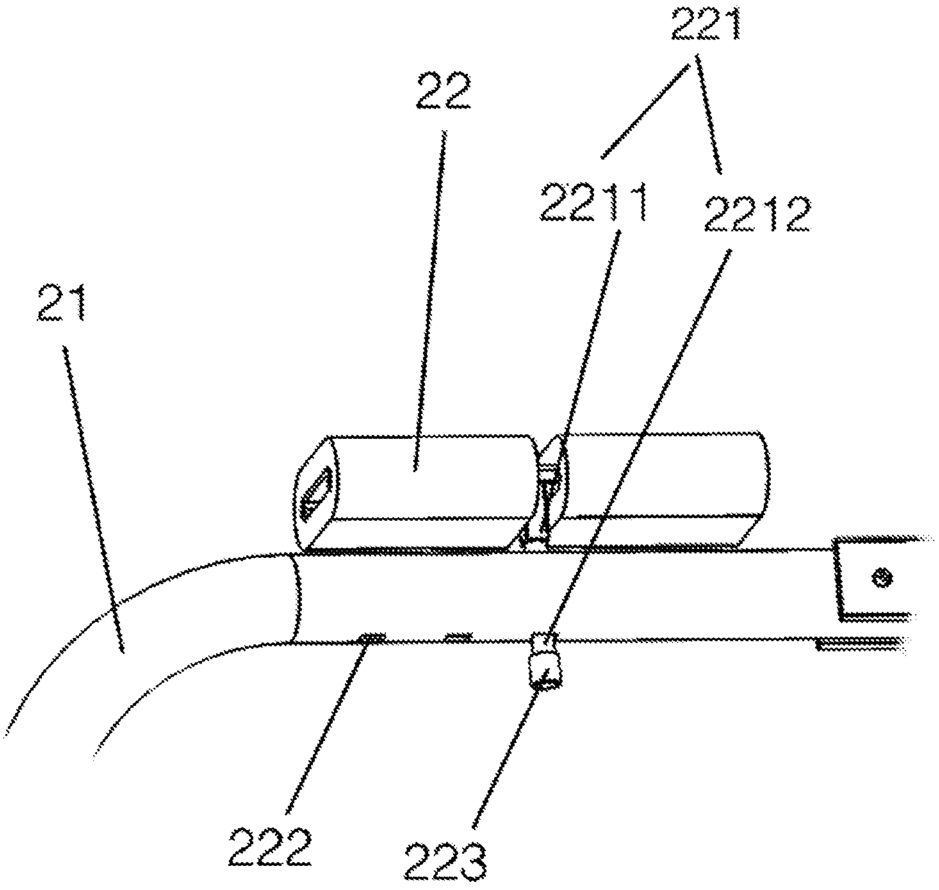
FIG. 8 is an enlarged fragmentary bottom perspective view of the walker of FIG. 4.

In the above embodiment, as shown in FIG. 8, the saddle seat 22 is provided with a vertical saddle rod 221 extended downward from the bottom surface of the saddle seat 22. The saddle rod 221 includes a first segment 2211 and a second segment 2212 connected sequentially from top to bottom. The cross section of the first segment 2211 is square, and the cross section of the second segment 2212 is circular. The front portion of rear leg tube 21 is provided with several vertical saddle seat holes 222, and each saddle hole 222 is square. The cross-section corresponds to the cross-section of the first segment 2211. At the bottom end the saddle seat rod 221 is provided with a rubber ring 223, preventing the saddle pole 221 from sliding out of the saddle seat hole 222. In the present embodiment, the saddle seat 22 can change its direction at any time and convert in between latitude and longitude position. In the latitude position it can support the user's bilateral buttock, while in longitude position it will be convenient for the user to freely get on and off the walking aid device from the rear end. While in operation, the user only needs to lift the saddle 22 so that only the second section 2212 of the saddle rod 221 is located in the saddle hole 222, rotate the saddle seat 90 degrees and put it down. Then, use the first section 2211 of the saddle rod 221 and the saddle hole 222 to achieve locking position.

In the above embodiment, at each end of the horizontal handle tube 15 is provided with a rotatable handle sleeve tube 151. Between the handle sleeve tube 151 and the handle tube 15 is provided numbers of corresponding elbow support positioning holes 152. The elbow support positioning hole 152 is provided with an elbow positioning pin not shown in the figure. The elbow support 16 and the handle sleeve tube 151 is connected by the elbow support connecting rod 161, forming an area for fingers passage between the two. The structure of the present embodiment of the patient's elbow support can be converted into a simple hand grip at any time by turning the handle sleeve tube 151 and repositioning it with the position pin.

In the above embodiments, the front wheel 111 and/or the rear wheel 211 are all caster wheels. The front wheels 111 can also be used as caster wheels, while the rear wheel 211 can be used as a friction pad. The most commonly used combination is that the front wheel 111 and the rear wheel 211 are all used as caster wheels, which can give the maximum freedom in turning, pivoting and moving side to side. The second combination is that two front wheels 111 are used as a regular straight wheel, and one rear wheel 211 turns into a caster wheel, which can reduce cost and help the user walk in a straight line. The third combination is where the two 2 front wheels 111 are used as caster wheels and the rear wheels 211 are used as friction blocks, which can increase its stability and control its speed. Finally, the front wheels 111 can be used as caster wheels and the rear wheel 211 as a regular straight wheel. The wheels can be replaced at any time as needed.

In order to adjust the height of the device in the above embodiment, located at the bottom of the front frame tube 11 is the front wheel tube 112. The front frame tube 11 and the front wheel tube 112 is provided with a number of corresponding front wheel positioning holes 113, and in the front wheel positioning hole 113 is a locking pin not shown in the figure. at the bottom of the rear frame tube 21 is the rear wheel tube 212 and the rear frame tube 21. The rear wheel tube 212 is provided with a number of corresponding rear leg positioning holes 213, and the rear leg position hole 213 is provided with a rear wheel locking pin not shown in the figure. The vertical tube of front frame 13 and the vertical tube of handle frame 14 is provided with a number of handle positioning holes 131. The handle positioning hole 131 is provided with a handle positioning pin 132.

The connection tube 12 of the present invention may also have one or more elastic bands not shown in figure attached to it. The end of the elastic band is wrapped around the patient's ankle area, so that the disabled person's leg can be moved forward by elastic band pulling.

The present invention is a mobility aid that has wheels, which is made of a lightweight metal material. The device is built as a reversed tricycle and has front frame 1 and rear frame 2. While in use, it can support the patient's buttock and elbows at the same time as the patient is standing and walking. It contains 3 retractable support legs, 2 support legs on front frame 1 and one support leg at the vertical portion of rear frame 2. Rear frame 2 may be folded. The connection between rear frame 2 and the front frame 1 is the hinge connection on top, and below is a wire rope connection or foldable tube connection. When the lower connection uses a tubular structure, the ring support 123 is connected to it. Each support leg is composed of a telescope structure that can change according to the height of the walker by adjusting the overlap distance of the upper and lower tubes. It has a T-shaped handle frame in front and a vertical tube 14. The handle frame and the main body is also composed of a telescope structure, and the height of the handle frame is also adjustable. The elbow support 16 is installed at both ends of the handle frame horizontal tube 15, and the bottom of elbow holder 16 is connected to the handle grip tube 151. Between the handle grip tube 151 and the handle horizontal tube 15 is a sliding fit, so that the elbow support 16 can be flipped up and down. The structure can also be fixed by the internal elastic locking pin. When the opening of elbow support 16 is face up, it is used for supporting the elbow, and when it is facing sideways or downward, its function is grip handle. Its position is locked by a pin through corresponding position holes on both tubes. On the rear leg tube 21 of the rear frame 2 has several square saddle seat inserting holes 222, the square hole is inserted with a saddle rod 221. The upper end of the saddle rod 221 is square and matches the square hole 222, the lower part of rod 221 is a cylinder, also with the square hole. The bottom end of the saddle pole 221 is equipped with a rubber ring 223, preventing the saddle pole 221 from sliding out of the square hole. The saddle 22 is rectangular, the orientation of which can be changed by rotating the saddle pole 221. On the front leg a connection tube 12 is connected to the elastic band. The free end of the elastic band has a Velcro buckle and can attach to the user's ankle to assist forward leg movement. This mobility aid is equipped with 3 wheels that can be switched between caster wheels, regular straight wheels and friction pad at any time.

The operation process of the present invention is: before starting to use, the patient sits on the edge of the bed or chair, places the mobility aid rear leg tube 21 in between the user's legs, and the saddle 22 is placed longitudinally and locked in place. The patient stands up and moves forward, and when their hips exceed the saddle 22, the saddle 22 is pulled up until the saddle pole 221 is out of the saddle hole 222 and rotated 90 degrees. Then, the saddle pole 221 is reinserted into the saddle hole 222 to lock it in the latitude position. At this time the saddle seat 22 supports the users buttocks and the patient is still in a standing position, their elbows placed into the elbow support 16. The height of the saddle 22 can be adjusted by changing the height of the front leg tube 11 and the rear leg tube 21, while the height of elbow support 16 can be adjusted by changing the height of the handle vertical tube 14. Optimal adjustment is when the patient is standing, the most of their body weight supported by the saddle seat 22, the rest of their body weight is supported by the elbow supports 16. The patient can walk and turn while maintaining an upright position, and if the patient's hands and arms are strong enough, the elbow support 16 can be rotated 90 degrees or 180 degrees and locked in place by position pin. At this time, the patient can grasp the handle tube 151 with both hands to support their upper body and steer the walker. If the patient's leg strength is too weak to move, fix the Velcro of the elastic band to the patient's ankle, and the elastic band can pull his leg forward when the leg is unweighted.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A walker, comprising:

a front frame, a rear frame, and a handle frame, the front frame having an inverted "U" shape forming front legs, a front wheel disposed at an end of each of the front legs, a front leg connector disposed between and joined to the front legs, a pair of frame connectors joined to a top generally horizontal portion of the front frame and configured to connect to the rear frame, and a vertical tube disposed in the top generally horizontal portion of the front frame between the pair of frame connectors and configured to slidably receive the handle frame, the rear frame having an inverted "L" shape, a lower portion of the rear frame forming a rear leg and an end of an upper portion of the rear frame joined to the frame connectors of the front frame, a rear wheel disposed at an end of the rear leg, a saddle seat disposed on the upper portion of the rear frame, and the handle frame having a "T" shape formed by a horizontal handle member and a vertical handle member depending from the horizontal handle member, the vertical handle member configured to be slidably received by the vertical tube of the front frame.

2. The walker according to claim 1, further comprising a first folding rod and a second folding rod, the first folding rod having a first end and a second end, the first end pivotally attached to the rear leg of the rear frame, and the second folding rod having a first end and a second end, the first end pivotally attached to the front leg connector of the front frame and the second end pivotally attached to the second end of the first folding rod.

3. The walker according to claim 2, including a ring-shaped support disposed on the second folding rod and configured to selectively hold an article.

4. The walker according to claim 1, further comprising a wire rope having a first end and a second end, the first end coupled to the front leg connector of the front frame and the second end coupled to the rear leg of the rear frame.

5. The walker according to claim 1, wherein the rear frame is pivotally connected to the pair of frame connectors of the front frame.

6. The walker according to claim 5, wherein the front frame includes a blocking plate disposed between and joined to the pair of frame connectors of the front frame, the blocking plate configured to limit a range of pivoting motion between the front frame and the rear frame.

7. The walker according to claim 5, wherein one of the frame connectors of the front frame includes a rear leg positioning hole, and the rear frame includes a rear frame locking pin, the rear frame locking pin and the rear leg positioning hole configured to cooperate to lock a position of the rear frame with respect to the front frame.

8. The walker according to claim 1, wherein the front wheel and the rear wheel and a friction block.

9. The walker according to claim 1, wherein each front leg includes an adjustable front leg member in slidable relation to the front frame, and the rear leg includes an adjustable rear leg member in slidable relation to the rear frame, the adjustable front leg member and the adjustable rear leg member configured to adjust a height of the walker.

10. The walker according to claim 9, wherein each front leg and the rear leg include a position hole, and each adjustable front leg member and the adjustable rear leg member include a locking pin, the position hole and the locking pin configured to cooperate to maintain the walker at an adjusted height.

11. The walker according to claim 1, wherein the rear frame includes a saddle seat hole and the saddle seat includes a saddle seat rod depending from the saddle seat, the saddle seat hole and the saddle seat rod configured for the saddle seat rod to be slidably received by the saddle seat hole securing the saddle seat to the rear frame.

12. The walker according to claim 11, wherein the saddle seat rod includes a first segment and a second segment, the first segment connected to the saddle seat and having a generally rectangular cross-sectional shape, the second segment having a generally circular cross-sectional shape and a ring member attached the second segment, the ring member configured to be placed on the second segment of the saddle seat rod when the saddle seat rod is received in the saddle seat hole to facilitate retaining the saddle seat rod in the saddle seat hole.

13. The walker of claim 12, wherein the saddle seat hole has a rectangular shape and is configured to receive the first segment of the saddle seat rod, the rectangular shape of the saddle seat hole and the rectangular shape of the first segment of the saddle seat rod cooperate to militate against a rotation of the saddle seat with respect to the rear frame when the first segment of the saddle seat rod is received by the saddle seat hole.

14. The walker of claim 1, wherein the vertical handle member of the handle frame includes a first handle positioning hole, the vertical tube of the front frame includes a second handle positioning hole, and a handle positioning pin is provided, the handle positioning pin configured to be selectively received through the first handle positioning hole and the second handle positioning hole to position the horizontal handle member of the handle frame at a desired height with respect to the front frame.

15. The walker of claim 1, wherein the handle frame includes a hand support plate attached to a center portion of the horizontal handle member, the hand support plate including a hand gripping sphere attached to a top surface of the hand support plate.

16. The walker of claim 1, wherein the handle frame includes an elbow support attached adjacent an end portion of the horizontal handle member.

17. The walker of claim 16, wherein the elbow support includes a rotatable handle sleeve configured to receive the horizontal handle member, the rotatable handle sleeve including an elbow support positioning hole and the horizontal handle member including an elbow support positioning pin, the elbow support positioning hole and the elbow support positioning pin cooperate to secure the elbow support at a desired position with respect to the horizontal handle member.

18. The walker of claim 1, further comprising a stretch band connected to the front leg connector.

19. A walker comprising:

a front frame, a rear frame, and a handle frame, the front frame having an inverted "U" shape forming front legs, a front wheel disposed at an end of each of the front legs, a front leg connector disposed between and joined to the front legs, a pair of frame connectors joined to a top generally horizontal portion of the front frame and configured to connect to the rear frame, a blocking plate disposed between and joined to the pair of frame connectors, and a vertical tube disposed in the top generally horizontal portion of the front frame between the pair of frame connectors and configured to slidably receive the handle frame, the rear frame having an inverted "L" shape, a lower portion of the rear frame forming a rear leg and an end of an upper portion of the rear frame pivotally joined to the frame connectors of the front frame, a wheel disposed at an end of the rear leg, and a saddle seat disposed on the upper portion of the rear frame, and the handle frame having a "T" shape formed by a horizontal handle member and a vertical handle member depending from the horizontal handle member, the vertical handle member configured to be slidably received by the vertical tube of the front frame, a hand support plate attached to a center portion of the horizontal handle member, the hand support plate including a hand gripping sphere attached to a top surface of the hand support plate, and an elbow support rotatably attached adjacent an end portion of the horizontal handle member.

20. A method of using a walker, comprising:

providing a walker including a front frame, a rear frame, and a handle frame, the front frame having an inverted "U" shape forming front legs, a front wheel disposed at an end of each of the front legs, a front leg connector disposed between and joined to the front legs, a pair of frame connectors joined to a top generally horizontal portion of the front frame and configured to connect to the rear frame, and a vertical tube disposed in the top generally horizontal portion of the front frame between the pair of frame connectors and configured to slidably receive the handle frame, the rear frame having an inverted "L" shape, a lower portion of the rear frame forming a rear leg and an end of an upper portion of the rear frame joined to the frame connectors of the front frame, a rear wheel disposed at an end of the rear leg, and a saddle seat disposed on the upper portion of the rear frame, and the handle frame having a "T" shape formed by a horizontal handle member and a vertical handle member depending from the horizontal handle member, the vertical handle member configured to be slidably received by the vertical tube of the front frame;

performing, by a user of the walker, one of:

standing over the rear frame with the rear frame located between the legs of the user;

walking while being supported by the walker; and supporting a buttock with the saddle seat of the rear frame.

* * * * *